United States Patent
Okita et al.

(10) Patent No.: US 7,348,745 B2
(45) Date of Patent: Mar. 25, 2008

(54) CONTROLLER

(75) Inventors: Tadashi Okita, Fujiyoshida (JP);
Yasusuke Iwashita, Fujiyoshida (JP);
Satoshi Ikai, Yamanashi (JP); Hiroyuki Kawamura, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 193 days.

(21) Appl. No.: 11/328,086

(22) Filed: Jan. 10, 2006

(65) Prior Publication Data
US 2006/0158143 A1    Jul. 20, 2006

(30) Foreign Application Priority Data
Jan. 20, 2005    (JP) .............................. 2005-012749

(51) Int. Cl.
*G05B 11/01*    (2006.01)
(52) U.S. Cl. .................. 318/560; 318/625; 318/432; 318/687
(58) Field of Classification Search ................ 318/560, 318/625, 727, 687, 135, 432
See application file for complete search history.

(56) References Cited

U.S. PATENT DOCUMENTS

| | | | |
|---|---|---|---|
| 4,473,786 A | * | 9/1984 | Miyashita et al. ........... 318/561 |
| 4,651,073 A | * | 3/1987 | Shimizu et al. ............. 318/632 |
| 5,142,210 A | * | 8/1992 | Kojima et al. .............. 318/566 |
| 5,250,880 A |   | 10/1993 | Chesney et al. |
| 5,493,909 A | * | 2/1996 | Araki ....................... 73/504.08 |
| 6,566,835 B1 | * | 5/2003 | Yoshida et al. ............. 318/569 |

FOREIGN PATENT DOCUMENTS

| | | |
|---|---|---|
| DE | 196 14 883 | 10/1997 |
| EP | 0 395 009 | 10/1990 |
| EP | 0 599 020 | 6/1994 |
| JP | 6-91482 | 4/1994 |

* cited by examiner

Primary Examiner—Rina Duda
(74) Attorney, Agent, or Firm—Staas & Halsey LLP

(57) ABSTRACT

First and second acceleration detectors are attached to first and second sections on a driven body, and values of accelerations α1 and α2 in a travel direction of the driven body are detected. On the basis of the difference or sum of the acceleration values α1 and α2, at least one of a position command, speed command, or current command for performing drive control of the driven body is corrected.

4 Claims, 5 Drawing Sheets

PRIOR ART

CONTROLLER

BACKGROUND OF THE INVENTION

1. Field of the Invention

The present invention relates to a controller for driving a large driven body by means of a servo motor and controlling the position or speed of the driven body.

2. Description of the Related Art

In working machinery, normally position feedback control, speed feedback control, and current feedback control is conducted in order to control the position or speed of a driven body which is driven by a servo motor. FIG. 5 is a block diagram of a servo control portion which controls the servo motor. A servo motor 2 or a driven body 3 which is driven by the servo motor 2 is provided with position detection means 6 and speed detection means 5 for detecting the speed and position of the servo motor 2 or the driven body 3. Current detection means 4 for detecting a current value for driving the servo motor 2 is also provided, and detection signals of these detection means 4, 5, and 6 are fed back.

A motor control portion 1 is subjected to digital control performed by a processor, and comprises a position control processing portion 11 in which position loop processing is performed, a speed control processing portion 12 in which speed loop processing is performed, and a current control processing portion 13 in which current loop processing is performed. The position control processing portion 11 obtains a position deviation on the basis of a position command and a position feedback signal which is sent from the position detection means 6, and multiply thus obtained position deviation by a position loop gain to obtain a speed command. The speed control processing portion 12 obtains a speed deviation on the basis of a speed command which is outputted from the position control processing portion 11 and a speed feedback signal sent from the speed detection means 5, and performs speed feedback control of proportional and integral (or subtracting the proportional component of the speed feedback signal from the integral of the speed deviation), and the like to obtain a current command. The current control processing portion 13 performs current feedback control by means of the current command and a current feedback signal, and performs drive control on the servo motor 2 via a servo amplifier.

The control processing of the position, speed, and current of the driven body 3, such as a feed axis in working machinery, as described above is generally performed, but normally this processing is performed by means of a processor. In the case in which the angular acceleration of the servo motor 2 is changed drastically when performing drive control on the servo motor 2 by performing such feedback control of the position, speed, and current, sometimes the driven body 3 vibrates. As a way to prevent generation of such vibration, there is proposed a control method in which an acceleration for detecting the acceleration of the driven body 3 is provided, the signal from the acceleration sensor is subtracted from the current command outputted by the speed feedback control so that the current command of the current feedback control is corrected, and the current feedback control is executed by means of the corrected current command.

In this control method, when the driven body vibrates, the component of the vibration in an acceleration signal of the driven body, which is detected by the acceleration sensor, is an error for the current command used for the current feedback control. Therefore, the vibration is controlled such that the vibration component is subtracted from the current command to eliminate such error so that the current command is corrected, and driving current of the servo motor is controlled by means of the corrected current command (see Japanese Patent Application Laid-open No. 6-91482).

In the case of large machinery such as a large driven body which is driven by a servo motor, even if the feedback control of the speed or position is performed, and the feedback control of the position is further performed to drive the servo motor to control the position or speed of the driven body, it is difficult to assume that the driven body is a single rigid body, because of the large size of the driven body, and since acceleration is different depending on the sections on the driven body, the driven body itself might vibrate.

Furthermore, there is a case in which a plurality of servo motors are used to drive a large driven body, but in such driving mode, the servo motors may interfere with one another, thereby causing the driven body to vibrate. In such a case, conventionally the interference is corrected by means of the speed feedback, but since sections on a driven body where speed feedback can be obtained are limited, it is difficult to control vibrations of the sections on the driven body where vibrations might occur.

SUMMARY OF THE INVENTION

The controller in accordance with the present invention, in a first mode thereof, comprises position/speed detection means for detecting the position and/or speed of a driven body, and controls the position and/or speed of the driven body on the basis of a detection value from the position/speed detection means, the controller further comprising at least two acceleration detection means which are disposed in different sections on the driven body and detect the accelerations in the sections, and command-correction means for correcting at least one of a position command, speed command, or current command on the basis of the accelerations in one direction, which are detected by the acceleration detection means.

The controller in accordance with the present invention, in a second mode thereof, comprises position/speed detection means for detecting the position/speed of a driven body, and controls the position and/or speed of the driven body on the basis of a detection value from the position/speed detection means, the controller further comprising at least two acceleration detection means which are disposed in different sections on the driven body and detect the accelerations in the sections, and command correction means for correcting at least one of a position command, speed command, or current command on the basis of the difference between the accelerations in one direction, which are detected by the acceleration detection means.

In the controller of the second mode, as the acceleration detection means, acceleration detection means for detecting the accelerations in a plurality of directions is used to obtain acceleration values of the driven body in travel directions by means of acceleration values of the respective directions, which are detected by this acceleration detection means, and to further obtain the difference between the acceleration values in the travel directions.

The controller in accordance with the present invention, in a third mode thereof, drives a driven body by means of a plurality of servo motors in one direction, comprises position/speed detection means for detecting the position and/or speed of the driven body, and controls the position and/or speed of the driven body on the basis of a detection value from the position/speed detection means, the controller further comprising at least two acceleration detection means which are disposed in different sections on the driven body and detect the accelerations in the sections, and command correction means for correcting at least one of a position command, speed command, or current command of each of the servo motors by using the accelerations detected by the acceleration detection means.

In the controller of the third mode, the driven body is driven by a first and second servo motors, and the acceleration detection means are disposed in the vicinity of sections on the driven body which is driven by the first and second servo motors. The command correction means obtains the difference between the accelerations by subtracting the acceleration detected by the acceleration detection means, which is disposed in the second servo motor side, from the acceleration detected by the acceleration detection means, which is disposed in the first servo motor side. The command correction means then performs negative feedback on thus obtained acceleration difference to the first servo motor to correct at least one of a position command, speed command, or current command, and at the same time may perform positive feedback on the acceleration difference to the second servo motor to correct at least one of the position command, speed command, or current command.

Furthermore, in the controller of the third mode, he acceleration detection means may be disposed in the vicinity of the sections on the driven body which is driven by each of the servo motors, and the command correction means may obtain the sum of the values of the accelerations detected by each of the acceleration detection means, and may perform negative feedback on thus obtained sum of the acceleration values to at least one of the position command, speed command, or current command of each of the servo motors, to correct the position command, speed command, or current command.

According to the present invention, even in the case of a large driven body, control thereof is performed such that the position command, speed command, or current command of each servo motor is corrected on the basis of the acceleration values, which are detected at a plurality of sections, so that the difference between the accelerations is not generated, thus vibration of the driven body can be prevented from occurring.

BRIEF DESCRIPTION OF THE DRAWINGS

The above-described and other objects and characteristics of the present invention are made apparent in the description of the embodiments below with reference to the attached diagrams, in which.

DETAILED DESCRIPTION OF THE PREFERRED EMBODIMENTS

Figure 1:
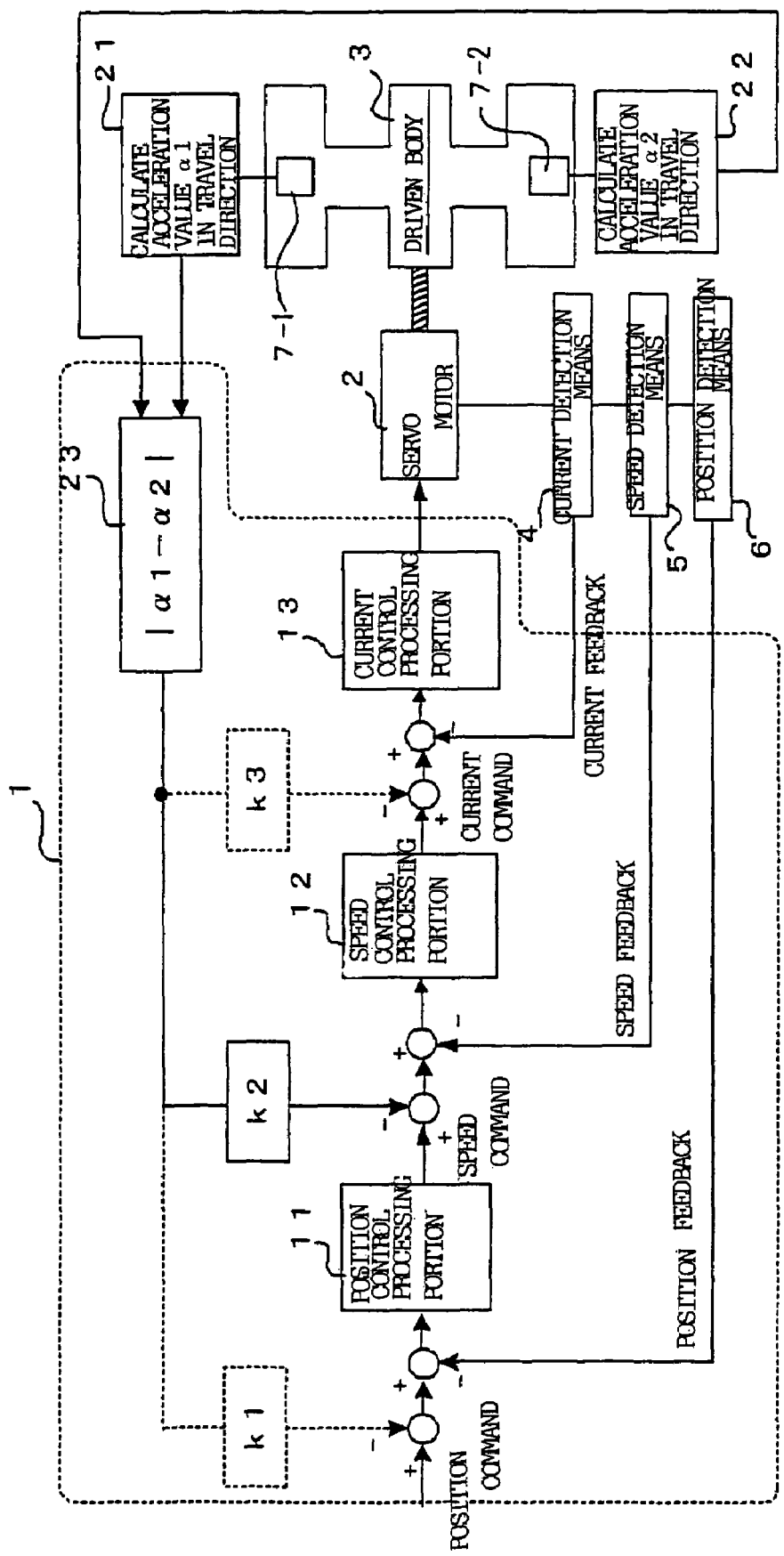
FIG. 1 is a block diagram showing an essential part of the controller in the first embodiment of the present invention.

FIG. 1 is a block diagram showing the essential part of the controller in the first embodiment of the present invention, the controller driving a large driven body.

Figure 5:
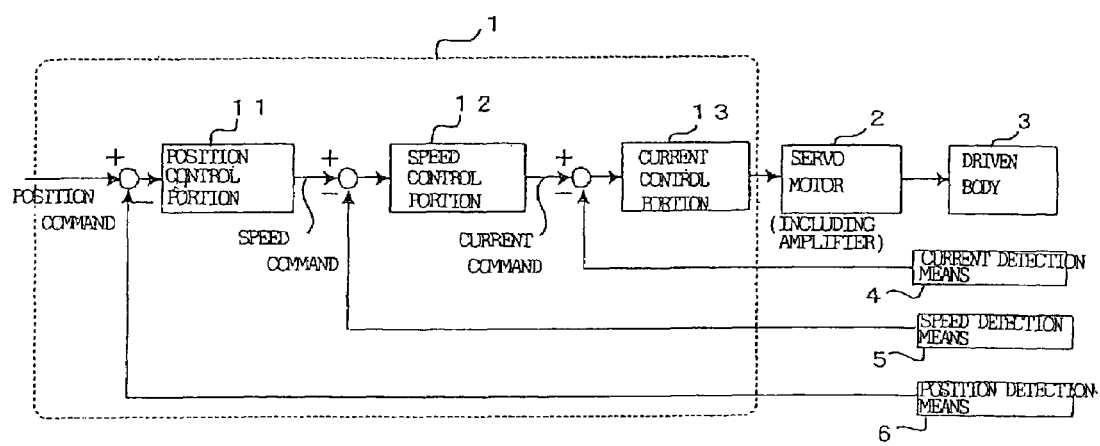
FIG. 5 is a block diagram showing an essential part of a conventional servo control portion which controls a servo motor.

In this embodiment, the large driven body 3 is driven by a servo motor 2. The configuration of a motor control portion 1 which performs drive control on the servo motor 2 is substantially the same as the conventional motor control portion shown in FIG. 5, but is different from a conventional servo control portion in that the motor control portion 1 is configured so as to correct the speed command or current command on the basis of the acceleration outputted by two acceleration detection means 7-1, 7-2, which are provided in the driven body 3.

The rigidities of the members configuring the driven body 3 are different in accordance with the sections on the driven body, in which case the difference is generated among the accelerations in the sections by the drive of the servo motor 2, whereby the whole members do not move integrally, resulting in occurrence of partial vibration of the driven body. For this reason, in the first embodiment, control is performed so that such vibration does not occur by disposing a plurality of acceleration detection means in the driven body 3. These acceleration detection means are disposed in the sections where vibration may occur, or specific sections where the position and speed of the driven body 3 receive particular attention. In the example shown in FIG. 1, the acceleration detection means 7-1, 7-2 are disposed in the both end portions of the driven body in a direction perpendicular to the direction in which the driven body 3 moves while being driven by the servo motor 2.

The acceleration detection means 7-1, 7-2 used in the example shown in FIG. 1 are the acceleration detection means for detecting the accelerations in a plurality of directions (two orthogonal axial directions or three orthogonal axial directions). Acceleration values $\alpha 1$ and $\alpha 2$ of the driven body 3 in the travel direction (direction in which the driven body 3 is driven by the servo motor 2) are calculated by acceleration calculation means 21, 22 on the basis of the values of the accelerations in the axial directions, which are detected by the acceleration detection means 7-1, 7-2. However, in the case where the acceleration detection means 7-1, 7-2 detect only the accelerations of the driven body 3 in the travel direction, the acceleration calculation means 21, 22 do not have to be provided, thus the output from the acceleration detection means 7-1, 7-2 directly become the acceleration values $\alpha 1$ and $\alpha 2$ of the driven body 3 in the travel direction.

Next, acceleration difference calculation means 23 is used to obtain the absolute value of the difference between the obtained acceleration values $\alpha 1$ and $\alpha 2$, and to obtain a correction value by multiplying the absolute value of the acceleration difference by a constant number k2, and thereby correcting a speed command by means of the correction value. FIG. 1 shows an example in which only the-speed command is corrected as indicated by the solid lines. However, instead of this pattern, the position command or current command may be-corrected as indicated by the dashed lines. In this case, the output from the acceleration difference calculation means 23 (the absolute value of the acceleration difference) is multiplied by a constant number k1 to obtain a correction value of the position command and correct the position command, or the output from the acceleration difference calculation means 23 is multiplied by a constant number k3 to obtain a correction value of the current command and correct the current command.

Further, at least two of the position command, speed command, or speed command, or current command may be corrected simultaneously.

The motor control portion 1 is subjected to digital control performed by a processor, and the processor executes, every predetermined cycle, the position loop processing in the position control processing portion 11, the speed loop processing in the speed control processing portion 12, the current loop processing in the current control processing portion 13, the processing of calculating the acceleration values α1 and α2 of the driven body 3 in the travel direction by means of the accelerations in the respective axial directions, which are detected by the acceleration detection means 7-1, 7-2, and to further obtain the absolute value of the acceleration difference (α1−α2), using the acceleration difference calculation means 23, and the processing of obtaining the correction value of the speed command by multiplying the absolute value of the acceleration difference (|α1−α2|) by the constant number k2 (and also obtaining the correction values of the position command and the current command by multiplying the absolute value of the acceleration difference by the constant numbers k1 and k3 respectively), and correcting the speed command.

Figure 2:
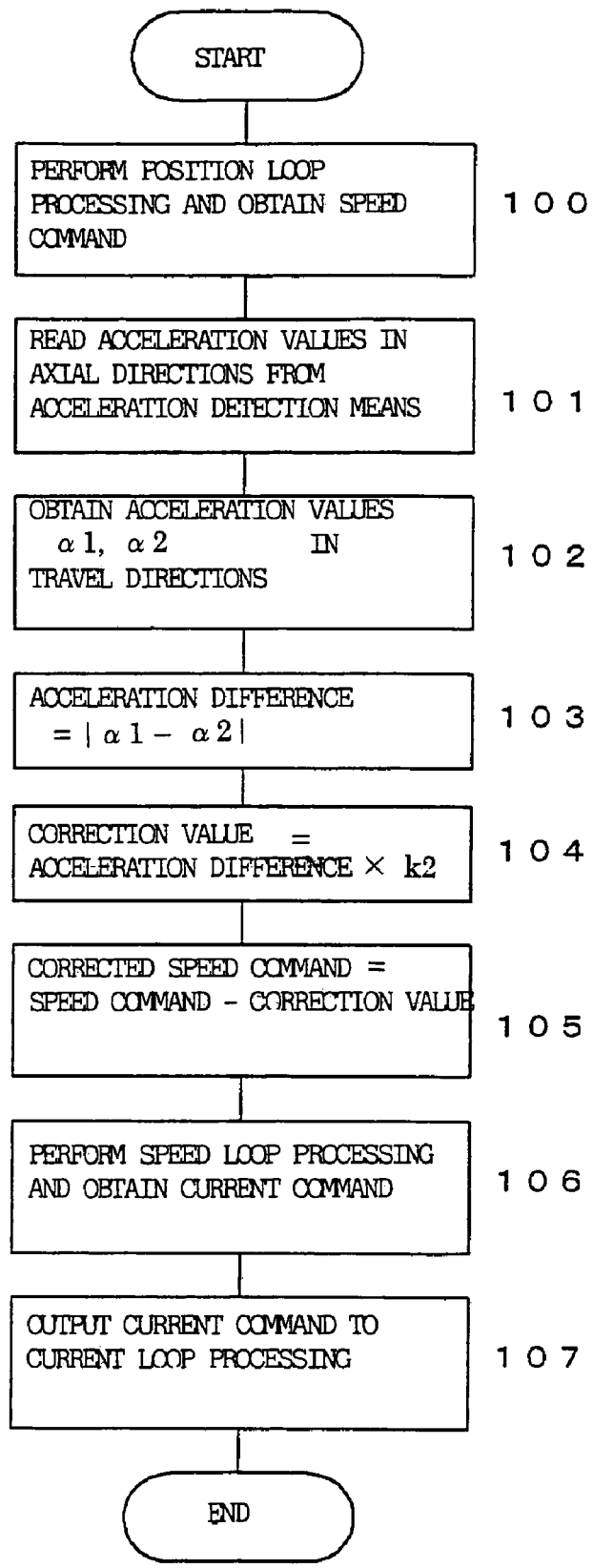
FIG. 2 is a flowchart showing position/speed loop processing which is executed by a processor of a motor control portion shown in FIG. 1, every predetermined cycle.

FIG. 2 is a flowchart showing the position/speed loop processing which is executed by the processor of the motor control portion 1 shown in FIG. 1, every predetermined cycle.

The processor of the motor control portion 1 executes the position loop processing in the position control processing portion 11 in the same manner as in the prior art to obtain the speed command (step 100). Specifically, the processor obtains a position deviation by subtracting the position feedback of the position detection means 6 for detecting the position of the driven body 3 from a position command outputted from a host controller such as a numerical control device, and obtains the speed command from the obtained position deviation.

Moreover, the processor reads the values of accelerations in the respective axial directions, which are detected by the acceleration detection means 7-1, 7-2 (step 101), causes the acceleration calculation means 21, 22 to calculate the acceleration values α1 and α2 of the driven body 3 in the travel direction on the basis of the acceleration values of the respective axial directions (step 102), and obtains the absolute value of the difference between the calculated acceleration values α1 and α2 by means of the acceleration difference calculation means 23 (step 103). Next, a correction value is obtained by multiplying the obtained absolute value of the acceleration difference by the constant number k2 (step 104). Then, the speed command is corrected by subtracting the obtained correction value from the speed command, which is obtained in the step 100 (step 105). Thereafter, a speed deviation is obtained by means of this corrected speed command and the speed feedback from the speed detection means 5 for detecting the speed of the driven body 3. The current command (torque command) is obtained by executing the speed loop processing of the speed control processing portion 12 using the obtained speed deviation (sep 106). Thereafter, the obtained current command is outputted to the current control processing portion 13 in which the current loop processing is executed (step 107).

The processor of the motor control portion 1 executes the above processings every predetermined cycle, and outputs the current command to the current control processing portion 13. In the current control processing portion 13, the same current loop processing as in the prior art is performed, every predetermined cycle, by means of the outputted current command and the current feedback from the current detection means 4, obtains a command for the servo motor 2, and drives the servo motor 2 via the servo amplifier.

The above processing in the motor control portion 1 is same as the conventional processing, except that the processings of the steps 101 through 105 in the flowchart of FIG. 2, i.e. the processings in which the speed command is corrected on the basis of the detected accelerations, are added. In the present embodiment, the vibration occurring in the driven body 3 is controlled by correcting the speed command by means of the detected accelerations.

When the absolute value of the difference between acceleration values α1 and α2 of the driven body 3 in the travel directions, obtained on the basis of the accelerations in the respective axial directions, which are detected by the acceleration detection means 7-1, 7-2, is large, in other words, when the difference between the accelerations in the sections where the acceleration detection means 7-1, 7-2 are disposed is large,. the correction value to be subtracted from the speed command, is also large, whereby the speed command outputted to the speed control processing portion 12 is reduced, as a result of which the current command outputted from the speed control processing portion 12 is also reduced. Since the servo motor 2 is driven by this reduced current command, vibration of the driven body 3 is controlled.

It should be noted that when correcting the position command, the processings of the steps 101 through 103 are executed before executing the processing of the step 100, the correction value of the speed command is obtained by multiplying the acceleration difference by the constant number k1, then the correction value is subtracted from the outputted position command to obtain a corrected position command, and the processing of the step 100 may be executed on the basis of this corrected position command. Furthermore, when correcting the current command, the corrected value of the current command is obtained by multiplying the acceleration difference by the constant number k3, then the corrected value is subtracted from the current command, which is obtained in the step 106, to obtain a corrected current command, and the processing may be passed to the current loop.

Figure 3:
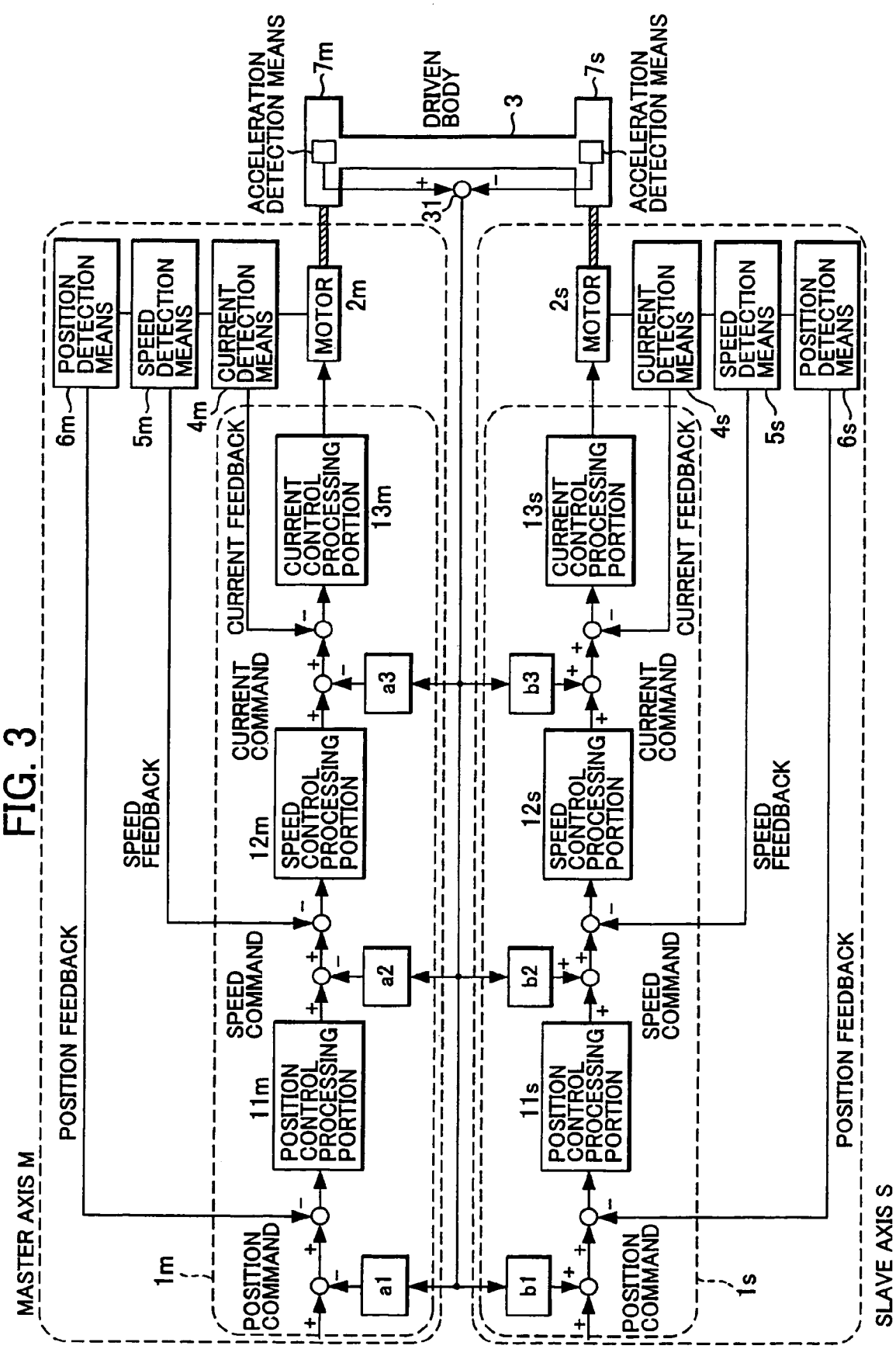
FIG. 3 is a block diagram showing an essential part of the controller in the second embodiment of the present invention.

FIG. 3 is a block diagram showing an essential part of the controller in the second embodiment of the present invention.

In the second embodiment, the large driven body 3 is driven by two servo motors (a servo motor 2*m* which drives the master axis M, and a servo motor 2*s* which drives the slave axis S) in one direction. Motor control portions 1*m* and 1*s* of the servo motors 2*m* and 2*s* driving the master axis M and slave axis S respectively comprise position control processing portions 11*m*, 11*s*, speed control processing portions 12*m*, 12*s*, and current control processing portions 13*m*, 13*s*, as in the conventional motor control portion. Furthermore, the servo motors 2*m*, 2*s*, which are subjected to drive control by the motor control portions 1*m*, 1*s* respectively, comprise position detection means 6*m*, 6*s*, speed detection means 5*m*, 5*s*, and current detection means 4*m*, 4*s*, and perform the position, speed, and current feedback. These configurations are the same as the conventional control system in which the driven body is driven by two servo motors in one direction.

In the case of driving the driven body 3 in one direction by means of such two servo motors, when the machine rigidity of the driven body 3 between the servo motors 2*m* and 2*s* is low, a torsion occurs between the sections driven by the servo motors 2*m* and 2*s*, causing vibration of the driven body. This torsion is in a relationship of opposite phases between the master axis M and the slave axis S such that the slave axis S side is not driven enough while the master axis M side is overly driven, or the slave axis S side is overly driven while the master axis M side is not driven enough. There is a problem that high gains in the position control processing portions 11m, 11s, the speed control processing portions 12m, 12s, and the current control processing portions 13m, 13s cannot be used because of vibrations caused by this torsion.

Therefore, in the second embodiment, on the driven body 3 acceleration detection means 7m is attached in the vicinity of the section driven by the servo motor 2m on the master axis M side, and acceleration detection means 7s is attached in the vicinity of the section driven by the servo motor 2s on the slave axis S side. The difference between the accelerations detected by the acceleration detection means 7m, 7s is used as a feedback signal to control the vibration of the driven body 3. It should be noted that the acceleration detection means 7m, 7s used in the second embodiment detect the acceleration in a direction in which the driven body 3 moves (a direction in which the driven body 3 is driven by the servo motors 2m, 2s). However, the acceleration detection means 7m, 7s may detect the accelerations in the plurality of directions as in the first embodiment, but in this case the acceleration of the driven body in the travel direction is obtained from the detected accelerations in the plurality of directions.

The acceleration difference is obtained by subtracting the value of acceleration detected by the acceleration detection means 7s on the slave axis S side from the value of acceleration detected by the acceleration detection means 7m on the master axis M side (processing performed by a subtracter 31). This acceleration difference (output from the subtracter 31) is subjected to the negative feedback to the master axis M, the position command is corrected by subtracting a value, which is obtained by multiplying the acceleration difference by a constant number a1, from the position command, the speed command is corrected by the subtracting a value, which is obtained by multiplying the acceleration difference by a constant number a2, from the speed command, and the current command is corrected by subtracting a value, which is obtained by multiplying the acceleration difference by a constant number a3, from the current command.

Moreover, the acceleration difference (output from the subtracter 31) is subjected to the positive feedback to the slave axis S side, the position command is corrected by adding a value, which is obtained by multiplying the acceleration difference by a constant number b1, to the position command, the speed command is corrected by adding a value, which is obtained by multiplying the acceleration difference by a constant number b2, to the speed command, and the current command is corrected by adding a value, which is obtained by multiplying the acceleration difference by a constant number b3, to the current command.

The position control processing (11m, 11s), speed control processing (12m, 12s), current control processing (13m, 13s) as in the prior art are conducted on the basis of the position command, speed command, and current command which are corrected as described above, and control of drive of each of the servo motors 2m, 2s is performed.

Specifically, the processors of the motor control portions 1m and 1s of the master axis and slave axis read the outputs of the acceleration detection means 7m and 7s every cycle of the position/speed loop processing, and obtains the acceleration difference by subtracting the value of acceleration detected by the acceleration detection means 7s on the slave axis S side from the value of acceleration Am detected by the acceleration detection means 7m on the master axis M side.

Thereafter, on the master axis M side, a corrected position command is obtained by subtracting the value which is obtained by multiplying the acceleration-difference by the constant number a1, from the position command. On the basis of this corrected position command and the position feedback of the position detection means 6m, the position loop processing is performed to obtain a speed command. From this speed command, the value which is obtained by multiplying the acceleration difference by the constant number a2 is subtracted, whereby a corrected speed command is obtained. On the basis of this corrected speed command and the speed feedback of the speed detection means 5m, the speed loop processing is performed to obtain a current command. Then, from this current command, the value which is obtained by multiplying the acceleration difference by the constant number a3 is subtracted, whereby a corrected current command is obtained, and then this corrected current command is passed to the current control processing portion 13m.

On the slave axis S side, on the other hand, a corrected position command is obtained by adding the value, which is obtained by multiplying the acceleration difference by the constant number b1, to the position command. On the basis of this corrected position command and the position feedback of the position detection means 6s, the position loop processing is performed to obtain a speed command. To this speed command, the value which is obtained by multiplying the acceleration difference by the constant number b2 is added, whereby a corrected speed command is obtained. On the basis of this corrected speed command and the speed feedback of the speed detection means 5s, the speed loop processing is performed to obtain a current command. Then, to this current command, the value which is obtained by multiplying the acceleration difference by the constant number b3 is added, whereby a corrected current command is obtained, and then this corrected current command is delivered to the current control processing portion 13s.

In this manner, the processors execute the processings of the motor control portions 1m, 1s every cycle of the position/speed loop processing. The processors then perform the current loop processing on the basis of the outputted current commands and the current feedback of the current detection means 4m, 4s in the master axis and the slave axis, every cycle of the current loop processing, as well as control the drive of each of the servo motors 2m, 2s.

When vibration occurs on the driven body 3 due to the torsion, the acceleration detection value of the acceleration detection means 7m and the acceleration detection value of the acceleration detection means 7s exhibit vibration waveforms of which phases are opposite to each other.

When the master axis M side is overly driven and the slave axis S side is not driven enough, the acceleration on the master axis M side becomes large, and the acceleration on the slave axis S side becomes small. In this case, in the present embodiment, the acceleration difference obtained by subtracting the acceleration on the slave axis S from the acceleration on the master axis M is multiplied by a constant number (a1, a2, a3) to perform the negative feedback on the acceleration on the master axis M, thus an effect of pulling the master axis M side to the slave axis S side is obtained. On the other hand, a value obtained by multiplying the acceleration difference by a constant number (b1, b2, b3) is subjected to the positive feedback on the slave axis S side, thus an effect of pushing the slave axis S side to the master axis M side is obtained. The same is applied to the case in which the slave axis S side is overly driven while the master axis M side is not driven enough, and the effects of bringing the master axis M side to the slave axis S side, and bringing the slave axis S side to the master axis M side can be obtained.

As described above, in order to prevent torsions on the master axis M and the slave axis S, the feedback control is performed on the acceleration on the slave axis S so as to cause the acceleration on the slave axis S to correspond to the acceleration on the master axis M. Consequently, torsions can be prevented from occurring.

In the second embodiment described above, the corrections by means of the negative feedback and positive feedback of the acceleration difference are applied to the position command, speed command, and current command respectively. However, instead of this pattern, the corrections by means of the negative feedback and positive feedback on the acceleration difference may be applied to the position command only, the speed command only, or the current command only. Alternatively, such corrections may be applied to at least two of the position command, speed command, or current command (specifically, in FIG. 3, one or two of the constant numbers a1, a2, a3, or one or two of the constant numbers b1, b2, b3, may be zero). In this manner, by preventing the torsions of the driven body, high gains in the position control processing portions $11m$, $11s$, the speed control processing portions $12m$, $12s$, and the current control processing portions $13m$, $13s$ can be used.

Figure 4:
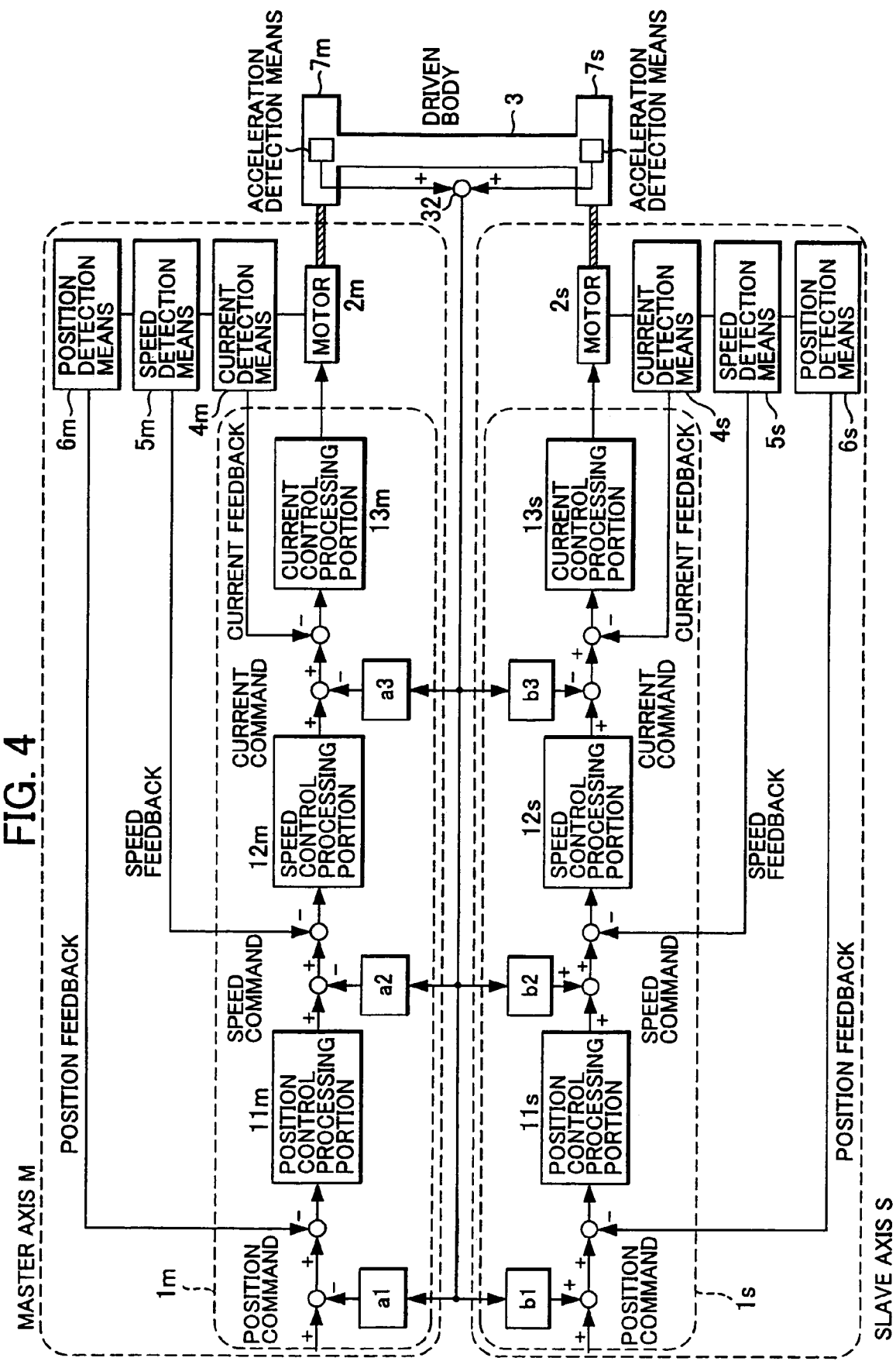
FIG. 4 is a block diagram showing an essential part of the controller in the third embodiment of the present invention.

FIG. 4 is a block diagram showing the essential part of the controller in the third embodiment of the present invention.

As in the second embodiment, in the third embodiment a large driven body is driven by two servo motors in one direction, but this case is applicable especially when the rigidity of the driven body between the servo motors is high.

In the present embodiment, high gains in the position, speed, and current control processing portions can be used, but when the gains are increased to some extent the driven body starts to vibrate. This vibration occurs in the same direction on the master axis side and the slave axis side. In order to prevent the vibration in the same direction from occurring, the sum of a detection value of the acceleration detected by the acceleration detection means in the vicinity of the master axis and a detection value of the acceleration detected by the acceleration detection means in the vicinity of the slave axis is used. It should be noted that a value obtained by dividing the sum of the accelerations by 2 is an average value of the acceleration on the master axis and the acceleration on the slave axis. Therefore, the sum of the accelerations is a value equivalent to the average value of the acceleration on the master axis and the acceleration on the slave axis. This sum of the accelerations is used as acceleration feedback. In the embodiment shown in FIG. 4, a value, which is obtained by multiplying the sum of the detected accelerations by a constant number, is subtracted from a position command, speed command, and current command to correct the position command, speed command, and current command, whereby an effect of preventing the vibration of the driven body is obtained.

The differences between the third embodiment shown in FIG. 4 and the second embodiment shown in FIG. 3 are only that a sum of the accelerations detected by the acceleration detection means $7m$, $7s$ is obtained, instead of obtaining the difference between the accelerations detected by the acceleration detection means $7m$, $7s$, disposed in the vicinities of the sections driven by the servo motors on the master axis M and slave axis S, and that the sum of the detected accelerations is subjected to the negative feedback on the both master axis M and slave axis S, thus the rest of the features of the third embodiment is same as those of the second embodiment shown in FIG. 3.

In the third embodiment, a sum of the accelerations detected by the acceleration detection means $7m$ and $7s$ on the master axis M and slave axis S respectively is obtained (processing performed by an adder 32). A value obtained by multiplying this sum of the acceleration values by the constant number a1 on the master axis M, and a value obtained by multiplying the sum of the acceleration values by the constant number b1 on the slave axis S are subtracted from the position commands respectively, whereby the position commands are corrected. Further, a value obtained by multiplying the sum of the accelerations by the constant number a2 on the master axis M, and a value obtained by multiplying the sum of the accelerations by the constant number b2 on the slave axis S are subtracted from the speed commands respectively, whereby the speed commands are corrected. Furthermore, a value obtained by multiplying the sum of the accelerations by the constant number a3 on the master axis M, and a value obtained by multiplying the sum of the accelerations by the constant number b3 on the slave axis S are subtracted from the current commands respectively, whereby the current commands are corrected.

The position control processing ($11m$, $11s$), speed control processing ($12m$, $12s$), current control processing ($13m$, $13s$) as in the prior art are conducted on the basis of the position commands, speed commands, and current commands which are corrected as described above, and control of drive of each of the servo motors $2m$, $2s$ is performed.

Then, the processors of the motor control portions $1m$ and $1s$ of the master axis and slave axis read the outputs of the acceleration detection means $7m$ and $7s$ every cycle of the position/speed loop processing, and obtains the sum of the accelerations which are detected by the acceleration detection means $7m$ on the master axis M and the acceleration detection means $7s$ on the slave axis S.

Thereafter, on the master axis M side, a corrected position command is obtained by subtracting the value which is obtained by multiplying the sum of the detected accelerations by the constant number a1 from the position command. On the basis of this corrected position command and the position feedback of the position detection means $6m$, the position loop processing is performed to obtain a speed command. From this speed command, the value which is obtained by multiplying the sum of the detected accelerations by the constant number a2 is subtracted, whereby a corrected speed command is obtained. On the basis of this corrected speed command and the speed feedback of the speed detection means $5m$, the speed loop processing is performed to obtain a current command. Then, from this current command, the value which is obtained by multiplying the sum of the detected accelerations by the constant number a3 is subtracted, whereby a corrected current command is obtained, and then this corrected current command is delivered to the current control processing portion 13 $m$.

On the slave axis S side, on the other hand, a corrected position command is obtained by subtracting the value which is obtained by multiplying the sum of the detected accelerations by the constant number b2 from the position command. On the basis of this corrected position command and the position feedback of the position detection means $6s$, the position loop processing is performed to obtain a speed command. From this speed command, the value which is obtained by multiplying the sum of the detected accelerations by the constant number b2 is subtracted, whereby a corrected speed command is obtained. On the basis of this corrected speed command and the speed feedback of the speed detection means 5s, the speed loop processing is performed to obtain a current command. Then, from this current command, the value which is obtained by multiplying the sum of the detected accelerations by the constant number b3 is subtracted, whereby a corrected current command is obtained, and then this corrected current command is delivered to the current control processing portion 13s.

The above processings are executed every cycle of the position/speed loop processing. The processors then perform the current loop processing on the basis of the current commands, which are outputted every cycle of the current loop processing, and the current feedback from the current detection means 4m and 4s, and perform control of drive on each of the servo motors 2m, 2s.

It should be noted that considered is a method in which the acceleration detection value from the acceleration detection means in the vicinity of the master axis is fed back to the master axis only, and the acceleration detection value from the acceleration detection means in the vicinity of the slave axis is fed back to the slave axis only, i.e. a method in which control is performed independently on the master axis and the slave axis. With this method, however, interference occurs between the master axis and the slave axis. For this reason, as described in the third embodiment, in terms of preventing the vibration of the driven body, it is rather advantageous to perform control of drive of the driven body by correcting the position command, speed command, and current command on the basis of the sum (average value) of the acceleration detection value from the acceleration detection means in the vicinity of the master axis and the acceleration detection value from the acceleration detection means in the vicinity of the slave axis.

It should be noted in the case of the third embodiment that, as in the second embodiment, the corrections by means of the feedback signal of the sum of the acceleration detection values may be applied to the position command only, speed command only, or current command only. Alternatively, the corrections may be applied to at least two of the position command, speed command, and current command.

By switching the control pattern from the second embodiment shown in FIG. 3 to the third embodiment shown in FIG. 4 or visa versa according to the rigidity of the driven body driven on the master axis and slave axis, the vibration of opposite phases and the vibration of same phases can be controlled.

Each of the above embodiments has described the examples of controlling the position and speed of the driven body, but the present invention can be applied to a controller for performing position control only, and a controller for performing speed control only.

Each of the above embodiments has described the examples of obtaining the position and speed of the driven body from the signals from the detectors of the servo motors, but the present invention can be applied to a case in which a scale is attached to the driven body. However, only a partial position and speed of the driven body are detected because the position for attaching the scale is limited due to the structure thereof. For this reason, by replacing the signal from the detector of the servo motor in each of the above embodiments with a signal from the scale, the effects of the present invention can be obtained in the case of using the scale as well.

What is claimed is:

1. A controller, comprising position/speed detection means for detecting the position and/or speed of a driven body, and controlling the position and/or speed of the driven body on the basis of a detection value from the position/speed detection means, wherein the controller further comprises:
   at least two acceleration detection means which are disposed in different sections on the driven body and detect the accelerations in the sections; and
   command correction means for correcting at least one of a position command, speed command, or current command of the driven body on the basis of the difference between the accelerations in one direction, which are detected by the acceleration detection means,
   wherein the acceleration detection means detects the accelerations in a plurality of directions; and
   the controller comprises calculation means for obtaining values of the accelerations in travel directions of the driven body from values of the accelerations in each of the plurality of directions, which are detected by the acceleration detection means, and obtaining the difference between the values of the accelerations in the travel directions.

2. A controller driving a driven body by means of a plurality of servo motors in one direction, comprising position/speed detection means for detecting the position and/or speed of the driven body, and controlling the position and/or speed of the driven body on the basis of a detection value from the position/speed detection means, wherein the controller further comprises:
   at least two acceleration detection means which are disposed in different sections on the driven body and detect the accelerations in the sections; and
   command correction means for correcting at least one of a position command, speed command, or current command of each of the servo motors that control the driven body by using the accelerations detected by the acceleration detection means.

3. The controller according to claim 2, wherein the driven body is driven by a first and second servo motors, the acceleration detection means are disposed in the vicinities of the sections on the driven body driven by the first and second servo motors; and
   the command correction means obtains an acceleration difference by subtracting the acceleration detected by the acceleration detection means disposed on the second servo motor from the acceleration detected by the acceleration detection means disposed on the first servo motor, subjects the obtained acceleration difference to negative feedback to the first servo motor to correct at least one of the position command, speed command, or current command, and subjects the acceleration difference to positive feedback to the second servo motor to correct at least one of the position command, speed command, or current command.

4. The controller according to claim 2, wherein the acceleration detection means are disposed in the vicinities of the sections on the driven body driven by each of the servo motors; and
   the command correction means obtains a sum of the values of the accelerations detected by the acceleration detection means, subjects thus obtained sum of the acceleration values to the negative feedback to at least one of the position command, speed command, or current command of each of the servo motors, and corrects the position command, speed command, or current command.

* * * * *

UNITED STATES PATENT AND TRADEMARK OFFICE
CERTIFICATE OF CORRECTION

PATENT NO. : 7,348,745 B2 Page 1 of 1
APPLICATION NO. : 11/328086
DATED : March 25, 2008
INVENTOR(S) : Tadashi Okita et al.

It is certified that error appears in the above-identified patent and that said Letters Patent is hereby corrected as shown below:

Column 4, Line 57, change "the-speed" to --the speed--.

Column 4, Line 60, "be-corrected" to --be corrected--.

Column 6, Line 19, change "large,." to --large,--.

Column 8, Line 5, change "acceleration-difference" to --acceleration difference--.

Column 10, Line 56, change "13 m." to --13m.--.

Column 10, Line 60, change "b2" to --b1--.

Signed and Sealed this

Fifth Day of August, 2008

JON W. DUDAS
*Director of the United States Patent and Trademark Office*